United States Patent

Bach et al.

[11] Patent Number: 5,151,506
[45] Date of Patent: Sep. 29, 1992

[54] PHENONEAZO DYES

[75] Inventors: Volker Bach, Neustadt; Guenter Hansen, Ludwigshafen; Gunther Lamm, Hassloch; Ruediger Sens, Mannheim, all of Fed. Rep. of Germany

[73] Assignee: Basf Aktiengesellschaft, Ludwigshafen, Fed. Rep. of Germany

[21] Appl. No.: 568,087

[22] Filed: Aug. 16, 1990

[30] Foreign Application Priority Data

Aug. 16, 1989 [DE] Fed. Rep. of Germany ....... 3927069

[51] Int. Cl.$^5$ .............................................. C09B 29/42
[52] U.S. Cl. ................................................. 534/772
[58] Field of Search ....................................... 534/772

[56] References Cited

U.S. PATENT DOCUMENTS 4,514,226  4/1985  Leoffler ............................. 106/23

FOREIGN PATENT DOCUMENTS

| | | |
|---|---|---|
| 0061667 | 10/1982 | European Pat. Off. . |
| 0066153 | 12/1982 | European Pat. Off. . |
| 0111004 | 6/1984 | European Pat. Off. . |
| 0133011 | 2/1985 | European Pat. Off. . |
| 0133012 | 2/1985 | European Pat. Off. . |
| 0192435 | 8/1986 | European Pat. Off. . |
| 0216483 | 4/1987 | European Pat. Off. . |
| 0227092 | 7/1987 | European Pat. Off. . |
| 0227094 | 7/1987 | European Pat. Off. . |
| 0227095 | 7/1987 | European Pat. Off. . |
| 0302401 | 2/1989 | European Pat. Off. . |
| 2001821 | 7/1971 | Fed. Rep. of Germany . |
| 2157229 | 5/1973 | Fed. Rep. of Germany . |
| 3524519 | 1/1986 | Fed. Rep. of Germany . |
| 3709567 | 10/1988 | Fed. Rep. of Germany . |
| 127392 | 6/1986 | Japan . |
| 199997 | 9/1986 | Japan . |
| 237694 | 10/1986 | Japan . |
| 283595 | 12/1986 | Japan . |

*Primary Examiner*—Richard L. Raymond
*Attorney, Agent, or Firm*—Oblon, Spivak, McClelland, Maier & Neustadt

[57] ABSTRACT

Phenoneazo dyes of the formula

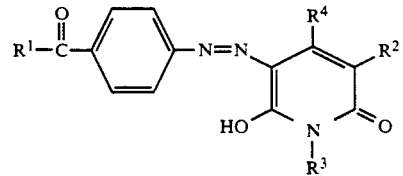

where
$R^1$ is substituted or unsubstituted $C_1$–$C_4$-alkyl or substituted phenyl,
$R^2$ is cyano, carbamoyl or acetyl,
$R^3$ is substituted or unsubstituted $C_1$–$C_4$-alkyl or $C_3$–$C_{12}$-alkyl which is interrupted by from 1 to 3 oxygen atoms and may be substituted, and
$R^4$ is hydrogen or $C_1$–$C_4$-alkyl, are useful for thermal transfer processes and for dyeing or printing synthetic fabrics.

4 Claims, No Drawings

PHENONEAZO DYES

The present invention relates to novel phenoneazo dyes of the formula I

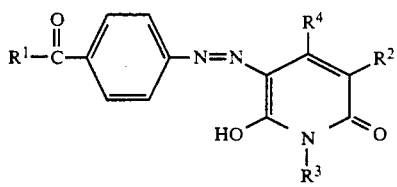

where $R^1$ is $C_1$-$C_4$-alkyl which may be $C_1$-$C_4$-alkoxy-substituted or a radical of the formula

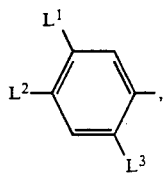

where $L^1$, $L^2$ and $L^3$ are identical or different and each is independently of the others hydrogen, $C_1$-$C_4$-alkyl or $C_1$-$C_4$-alkoxy, $R^2$ is cyano, carbamoyl or acetyl, $R^3$ is $C_1$-$C_4$-alkyl which may be imidazol-1-yl-substituted or $C_3$-$C_{12}$-alkyl which is interrupted by from 1 to 3 oxygen atoms and may be substituted by $C_1$-$C_4$-alkanoyloxy, cyclohexyloxy, phenoxy which may be $C_1$-$C_4$-alkoxy-substituted or phenyl, and $R^4$ is hydrogen or $C_1$-$C_4$-alkyl, with the proviso that (a) $L^1$, $L^2$ and $L^3$ are not all hydrogen at one and the same time, (b) when two of $L^1$, $L^2$ and $L^3$ are hydrogen, the third is $C_1$-$C_4$-alkoxy, or (c) when two of $L^1$, $L^2$ and $L^3$ are hydrogen and $R^3$ is $CH_2(C_2H_4O)_2C_6H_5$, $CH_2(C_2H_4O)_2C_6H_{11}$ or $C_3H_6OCH_2C_6H_5$, the third member of the set may also be isopropyl, and to a process for the thermal transfer of phenoneazo dyes DE-A-2 001 821, DE-A-2 157 229 and also EP-A-302 401 already disclose azo dyes where the diazo component is derived from an aminobenzophenone and the coupling component is a hydroxypyridone.

It is an object of the present invention to provide new phenoneazo dyes which are suitable for use as disperse dyes and have advantageous application properties.

We have found that this object is achieved by the phenoneazo dyes of the formula I defined at he beginning.

Any alkyl appearing in the phenoneazo dyes of the formula I and in the formula II to be defined hereinafter is either straight-chain or branched.

$R^1$, $R^3$, $L^1$, $L^2$ and $L^3$ are each for example methyl, ethyl, propyl, isopropyl, butyl, isobutyl or sec-butyl.

$R^1$ may also be for example methoxymethyl, ethoxymethyl, 2-methoxyethyl or 2-ethoxyethyl.

$L^1$, $L^2$ and $L^3$ may each also be for example methoxy, ethoxy, propoxy, isopropoxy, butoxy, isobutoxy or sec-butoxy.

$R^3$ may also be for example 2-(imidazol-1-yl)ethyl, 2- or 3-(imidazol-1-yl)propyl, 2- or 4-(imidazol-1-yl)butyl, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,9-trioxadecyl, 3,6,9-trioxaundecyl, 8-acetyloxy-4-oxaoctyl, 3-cyclohexyloxypropyl, 3-benzyloxypropyl or 6-phenoxy-4-oxahexyl.

Preference is given to phenoneazo dyes of the formula I where $R^1$ is a radical of the formula

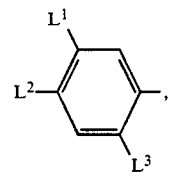

in which two members of the set $L^1$, $L^2$ and $L^3$ are each hydrogen and the third member is $C_1$-$C_2$-alkoxy or two members of the set $L^1$, $L^2$ and $L^3$ are each methyl and the third is hydrogen, $R^2$ is cyano, $R^4$ is methyl and $R^3$ is as defined above.

The phenone dyes of the formula I according to the present invention are prepared in a conventional manner.

For instance, by diazotizing an aminophenone of the formula III

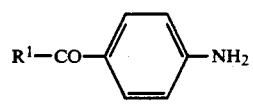

where $R^1$ is as defined above, and coupling it to a pyridone of the formula IV

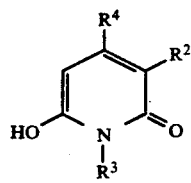

where $R^2$, $R^3$ and $R^4$ are each as defined above.

The preparation of the aminophenones of the formula III and of the pyridones of the formula IV is known per se and described for example in EP-A-66 153, in previously cited EP-A-302 401 and in the references mentioned therein, or they may be prepared by similar methods.

The novel dyes of the formula I are suitable for dyeing or printing synthetic fabrics, in particular polyester fabrics. The dyeings or prints obtained have good wet fastness and light fastness properties. The novel dyes are notable in particular for their high color strength.

For the abovementioned purposes it is possible to use the novel dyes I not only as individual components but also as mixtures with one another (for example in a weight ratio of from 50:50 to 99:1).

It is a further object of the present invention to provide a new process for transferring azo dyes from a transfer to a plastic-coated paper, for which the dyes should have the following properties:
ready thermal transferability,
little tendency to migrate within or out of the surface coating of the receiving medium at room temperature,
high thermal and photochemical stability and also resistance to moisture and chemical agents,
suitable hues for subtractive color mixtures,
a high molar absorption coefficient,
resistance to crystallization on storage of the transfer sheet,
ready industrial availability.

We have found that this object is achieved and that the transfer of azo dyes from a transfer to a plastic-coated paper by diffusion with the aid of a thermal printing head is possible to advantageous effect on using a transfer on which there is or are present one or more azo dyes of the formula II

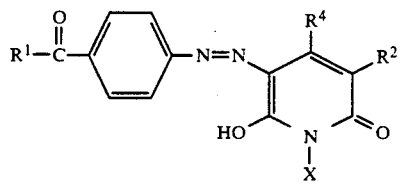 (II)

where
$R^1$ is $C_1$–$C_4$-alkyl which may be $C_1$–$C_4$-alkoxy-substituted or a radical of the formula

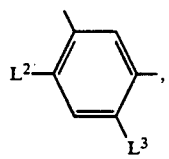

where $L^1$, $L^2$ and $L^3$ are identical or different and each is independently of the others hydrogen, $C_1$–$C_4$-alkyl or $C_1$–$C_4$-alkoxy,
$R^2$ is cyano, carbamoyl or acetyl,
X is $C_1$–$C_4$-alkyl or $C_3$–$C_{12}$-alkyl which is interrupted by from 1 to 3 oxygen atoms and may be substituted by $C_1$–$C_4$-alkanoyloxy, cyclohexyloxy, phenoxy which may be $C_1$–$C_4$-alkoxy-substituted or phenyl, and
$R^4$ is hydrogen or $C_1$–$C_4$-alkyl,
with the proviso that $L^1$, $L^2$ and $L^3$ are not all hydrogen at one and the same time.

To prepare the transfer required for the novel process, the dyes are incorporated into a suitable organic solvent, e.g. chlorobenzene, isobutanol, methyl ethyl ketone, methylene chloride, toluene, tetrahydrofuran or a mixture thereof, together with one or more binders and with or without the addition of other auxiliaries to form a printing ink, in which the dye is preferably present in a molecularly dissolved form. The printing ink is applied to the inert substrate by knife coating and the coating is dried in air. Suitable binders are all resins and polymer materials which are soluble in organic solvents and capable of binding the dye to the inert substrate in such a way that it will not rub off. Preference is given to those binders which, after the printing ink has dried in air, hold the dye in the form of a clear, transparent film without visible crystallization of the dye.

Examples of such binders are cellulose derivatives, e.g. methylcellulose, ethylcellulose, ethylhydroxyethylcellulose, hydroxypropylcellulose, cellulose acetate or cellulose acetobutyrate, starch, alginates, alkyd resins, vinyl resins, polyvinyl alcohol, polyvinyl acetate, polyvinyl butyrate and polyvinylpyrrolidones. It is also possible to use polymers and copolymers of acrylates or derivatives thereof, such as polyacrylic acid, polymethyl methacrylate or styrene-acrylate copolymers, polyester resins, polyamide resins, polyurethane resins or natural CH resins, such as gum arabic. Other suitable binders are described for example in DE-A-3 524 519.

The preferred binders are ethylcellulose and ethylhydroxyethylcellulose of medium or low viscosity.

The ratio of binder to dye is preferably within the range from 5:1 to 1:1.

Suitable assistants are for example release agents as described in EP-A-227 092, EP-A-192 435 and the patent applications cited therein and also in particular organic additives which stop the transfer dye from crystallizing in the course of storage or heating of the inked ribbon, for example cholesterol or vanillin. Inert substrates are for example tissue, blotting or parchment paper or plastics films of high heat stability, for example uncoated or metal-coated polyester, polyamide or polyimide. The inert substrate may additionally be coated on the side facing the thermal printing head with a lubricant, or slipping, layer in order to prevent adhesion of the thermal printing head to the substrate material. Suitable lubricants are described for example in EP-A-216 483 and EP-A-227 095. The thickness of the substrate is in general from 3 to 30 μm, preferably from 5 to 10 μm.

Suitable dye receiver layers are basically all temperature stable plastic layers having an affinity for the dyes to be transferred. Their glass transition temperature should be below 150° C. Examples are modified polycarbonates and polyesters. Suitable recipes for the receiver layer composition are described in detail for example in EP-A-227 094, EP-A-133 012, EP-A-133 011, EP-A-111 004, JP-A-199 997/1986, JP-A-283 595/1986, JP-A-237 694/1986 and JP-A-127 392/1986.

Transfer is effected by means of a thermal printing head which must be heatable to a temperature ≧300° C. for dye transfer to take place within the time interval t: 0<t<15 msec. On heating, the dye migrates out of the transfer sheet and diffuses into the surface coat of the receiving medium.

Details of the preparation may be found in the Examples, the percentages being by weight, unless otherwise stated.

PREPARATION OF DYES

Example 1

24.2 g of 4-amino-2-methoxy-5-methylbenzophenone were dissolved in 50 g of N,N-dimethylformamide. The solution was stirred into a mixture of 30 ml of concentrated hydrochloric acid, 300 ml of water and 0.5 g of a dispersant (addition product of ethylene oxide with oleylamine). The mixture was cooled and diazotized at from 0° to 5° C. by the addition of 32.5 ml of a 23% strength by weight sodium nitrite solution. The mixture was subsequently stirred at from 0° to 5° C. for 2 hours, the excess nitrite was destroyed with amidosulfuric acid, and the diazonium salt was run into a solution of 32.8 g of the pyridone of the formula

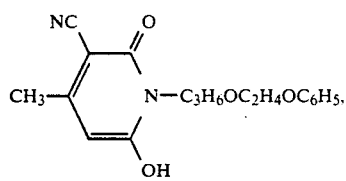

in 1,000 ml of water and 8 9 of sodium carbonate in such a way that the pH of the coupling mixture was always >8-ca. 10. The acid-binding agent used was sodium carbonate. The reaction mixture was stirred at pH 8.5-9.5 for 2 hours. It was then heated to 50° C. before isolation of the dye of the formula

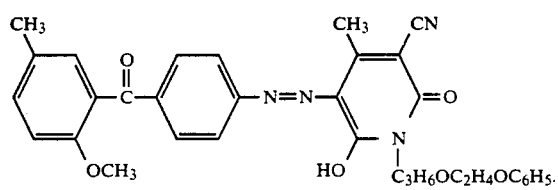

Washing with water and drying left 56.5 g of a yellow powder which forms yellow solutions in N,N-dimethylformamide and acetone and dyes polyester fabric by the HT process in deep butter yellow hues of high fastness to thermofixing and of excellent light fastness.

The following dyes are obtained in a similar manner:

TABLE 1

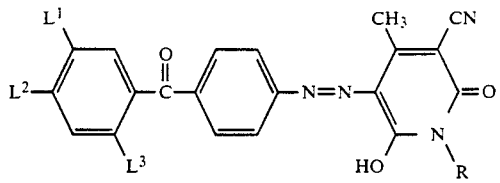

| Ex. No. | $L^1$ | $L^2$ | $L^3$ | R | $\lambda_{max}$ [nm] in acetone |
|---|---|---|---|---|---|
| 2 | OCH$_3$ | H | CH$_3$ | CH$_3$ | 432 |
| 3 | OCH$_3$ | H | CH$_3$ | C$_2$H$_5$ | 432 |
| 4 | OCH$_3$ | H | CH$_3$ | C$_2$H$_4$OCH$_3$ | 432 |
| 5 | OCH$_3$ | H | CH$_3$ | C$_3$H$_6$OCH$_3$ | 432 |
| 6 | OCH$_3$ | H | CH$_3$ | C$_2$H$_4$OC$_2$H$_5$ | 432 |
| 7 | OCH$_3$ | H | CH$_3$ | C$_3$H$_6$OC$_2$H$_5$ | 432 |
| 8 | OCH$_3$ | H | CH$_3$ | C$_3$H$_6$OC$_4$H$_8$OCOCH$_3$ | 432 |
| 9 | OCH$_3$ | H | CH$_3$ | CH$_2$(C$_2$H$_4$O)$_2$CH$_3$ | 432 |
| 10 | OCH$_3$ | H | CH$_3$ | CH$_2$(C$_2$H$_4$O)$_2$C$_2$H$_5$ | 432 |
| 11 | OCH$_3$ | H | CH$_3$ | CH$_2$(C$_2$H$_4$O)$_2$C$_6$H$_5$ | 432 |
| 12 | OCH$_3$ | H | CH$_3$ | CH$_2$(C$_2$H$_4$O)$_2$C$_4$H$_9$ | 432 |
| 13 | OCH$_3$ | H | CH$_3$ | CH$_2$(C$_2$H$_4$O)$_3$C$_2$H$_5$ | 432 |
| 14 | OCH$_3$ | H | CH$_3$ | C$_3$H$_6$—N-pyrazolyl | 433 |
| 15 | OCH$_3$ | H | CH$_3$ | C$_4$H$_9$(n) | 432 |
| 16 | OCH$_3$ | H | CH$_3$ | C$_3$H$_6$OCH$_2$C$_6$H$_5$ | 432 |
| 17 | OCH$_3$ | H | CH$_3$ | CHCH$_2$OCH$_3$ \| CH$_3$ | 432 |
| 18 | CH$_3$ | H | CH$_3$ | CHCH$_2$OCH$_3$ \| CH$_3$ | 431 |
| 18a | CH$_3$ | H | CH$_3$ | C$_4$H$_9$(n) | 431 |
| 19 | CH$_3$ | H | CH$_3$ | CH$_2$(C$_2$H$_4$O)$_2$C$_6$H$_5$ | 431 |
| 20 | CH$_3$ | H | CH$_3$ | CH$_2$(C$_2$H$_4$O)$_2$C$_2$H$_5$ | 431 |
| 21 | CH$_3$ | H | CH$_3$ | C$_3$H$_6$OC$_4$H$_8$OCOCH$_3$ | 431 |
| 22 | H | OCH$_3$ | H | CH$_3$ | 434 |
| 23 | H | OCH$_3$ | H | C$_2$H$_5$ | 434 |
| 24 | H | OCH$_3$ | H | C$_2$H$_4$OCH$_3$ | 434 |
| 25 | H | OCH$_3$ | H | C$_3$H$_6$OCH$_3$ | 434 |
| 26 | H | OCH$_3$ | H | C$_2$H$_4$OC$_2$H$_5$ | 435 |
| 27 | H | OCH$_3$ | H | C$_3$H$_6$OC$_2$H$_5$ | 433 |
| 28 | H | OCH$_3$ | H | C$_3$H$_6$OC$_4$H$_8$OCOCH$_3$ | 433 |
| 29 | H | OCH$_3$ | H | CH$_2$(C$_2$H$_4$O)$_2$CH$_3$ | 433 |
| 30 | H | OCH$_3$ | H | CH$_2$(C$_2$H$_4$O)$_2$C$_2$H$_5$ | 433 |
| 31 | H | OCH$_3$ | H | CH$_2$(C$_2$H$_4$O)$_2$C$_6$H$_5$ | 433 |
| 32 | H | OCH$_3$ | H | CH$_2$(C$_2$H$_4$O)$_2$C$_4$H$_9$ | 433 |
| 33 | H | OCH$_3$ | H | CH$_2$(C$_2$H$_4$O)$_3$C$_2$H$_5$ | 433 |
| 34 | H | OCH$_3$ | H | C$_3$H$_6$—N-pyrazolyl | 434 |
| 35 | H | OCH$_3$ | H | C$_4$H$_9$(n) | 433 |
| 36 | H | OCH$_3$ | H | C$_3$H$_6$OCH$_2$C$_6$H$_5$ | 433 |
| 37 | H | OCH$_3$ | H | CHCH$_2$OCH$_3$ \| CH$_3$ | 433 |
| 38 | H | OCH$_3$ | H | C$_3$H$_6$O-cyclohexyl | 433 |
| 39 | H | OC$_2$H$_5$ | H | C$_3$H$_6$O-cyclohexyl | 433 |
| 40 | H | OC$_2$H$_5$ | H | CH$_3$ | 434 |
| 41 | H | OC$_2$H$_5$ | H | C$_2$H$_5$ | 434 |
| 42 | H | OC$_2$H$_5$ | H | C$_2$H$_4$OCH$_3$ | 434 |
| 43 | H | OC$_2$H$_5$ | H | C$_3$H$_6$OCH$_3$ | 434 |
| 44 | H | OC$_2$H$_5$ | H | C$_2$H$_4$OC$_2$H$_5$ | 434 |
| 45 | H | OC$_2$H$_5$ | H | C$_3$H$_6$OC$_2$H$_5$ | 434 |
| 46 | H | OC$_2$H$_5$ | H | C$_3$H$_6$OC$_4$H$_8$OCOCH$_3$ | 434 |
| 47 | H | OC$_2$H$_5$ | H | CH$_2$(C$_2$H$_4$O)$_2$CH$_3$ | 434 |
| 48 | H | OC$_2$H$_5$ | H | CH$_2$(C$_2$H$_4$O)$_2$C$_2$H$_5$ | 434 |
| 49 | H | OC$_2$H$_5$ | H | CH$_2$(C$_2$H$_4$O)$_2$C$_6$H$_5$ | 434 |
| 50 | H | OC$_2$H$_5$ | H | CH$_2$(C$_2$H$_4$O)$_2$C$_4$H$_9$ | 434 |
| 51 | H | OC$_2$H$_5$ | H | CH$_2$(C$_2$H$_4$O)$_3$C$_2$H$_5$ | 434 |
| 52 | H | OC$_2$H$_5$ | H | C$_3$H$_6$—N-pyrazolyl | 433 |
| 53 | H | OC$_2$H$_5$ | H | C$_4$H$_9$(n) | 433 |

TABLE 1-continued

Structure:

$L^1, L^2, L^3$ - substituted benzoyl-phenyl-azo pyridone with CH3, CN, CH3 substituents, and N-R, with OH and =O groups.

| Ex. No. | $L^1$ | $L^2$ | $L^3$ | R | $\lambda_{max}$ [nm] in acetone |
|---|---|---|---|---|---|
| 54 | H | $OC_2H_5$ | H | $C_3H_6OCH_2C_6H_5$ | 434 |
| 55 | H | $OC_2H_5$ | H | $CHCH_2OCH_3$ / $CH_3$ | 433 |
| 56 | $CH_3$ | $OCH_3$ | H | $CH_2(C_2H_4O)_2C_6H_5$ | 434 |
| 57 | $CH_3$ | $OCH_3$ | H | $CH_2(C_2H_4O)_2C_2H_5$ | 434 |
| 58 | $CH_3$ | H | $OCH_3$ | $C_3H_6O$-cyclohexyl | 434 |
| 59 | $CH_3$ | H | $OCH_3$ | $CH_3$ | 435 |
| 60 | $CH_3$ | H | $OCH_3$ | $C_2H_5$ | 434 |
| 61 | $CH_3$ | H | $OCH_3$ | $C_2H_4OCH_3$ | 435 |
| 62 | $CH_3$ | H | $OCH_3$ | $C_3H_6OCH_3$ | 435 |
| 63 | $CH_3$ | H | $OCH_3$ | $C_2H_4OC_2H_5$ | 435 |
| 64 | $CH_3$ | H | $OCH_3$ | $C_3H_6OC_2H_5$ | 435 |
| 65 | $CH_3$ | H | $OCH_3$ | $C_3H_6OC_4H_8OCOCH_3$ | 435 |
| 66 | $CH_3$ | H | $OCH_3$ | $CH_2(C_2H_4O)_2CH_3$ | 435 |
| 67 | $CH_3$ | H | $OCH_3$ | $CH_2(C_2H_4O)_2C_2H_5$ | 435 |
| 68 | $CH_3$ | H | $OCH_3$ | $CH_2(C_2H_4O)_2C_6H_5$ | 435 |
| 69 | $CH_3$ | H | $OCH_3$ | $CH_2(C_2H_4O)_2C_4H_9$ | 435 |
| 70 | $CH_3$ | H | $OCH_3$ | $CH_2(C_2H_4O)_3C_2H_5$ | 435 |
| 71 | $CH_3$ | H | $OCH_3$ | $C_3H_6$-pyrazolyl | 434 |
| 72 | $CH_3$ | H | $OCH_3$ | $C_4H_9(n)$ | 435 |
| 73 | $CH_3$ | H | $OCH_3$ | $C_3H_6OCH_2C_6H_5$ | 435 |
| 74 | $CH_3$ | H | $OCH_3$ | $CHCH_2OCH_3$ / $CH_3$ | 435 |
| 75 | $CH_3$ | H | $OC_2H_5$ | $CH_2(C_2H_4O)_2C_6H_5$ | 435 |
| 76 | $OCH_3$ | $CH_3$ | H | $CH_2(C_2H_4O)_2C_6H_5$ | 432 |
| 77 | $CH_3$ | $CH_3$ | H | $CH_2(C_2H_4O)_2C_6H_5$ | 431 |
| 78 | $CH_3$ | $CH_3$ | H | $CH_3$ | 432 |
| 79 | $CH_3$ | $CH_3$ | H | $C_2H_5$ | 432 |
| 80 | $CH_3$ | $CH_3$ | H | $C_2H_4OCH_3$ | 432 |
| 81 | $CH_3$ | $CH_3$ | H | $C_3H_6OCH_3$ | 432 |
| 82 | $CH_3$ | $CH_3$ | H | $C_2H_4OC_2H_5$ | 432 |
| 83 | $CH_3$ | $CH_3$ | H | $C_3H_6OC_2H_5$ | 432 |
| 84 | $CH_3$ | $CH_3$ | H | $C_3H_6OC_4H_8OCOCH_3$ | 432 |
| 85 | $CH_3$ | $CH_3$ | H | $CH_2(C_2H_4O)_2CH_3$ | 432 |
| 86 | $CH_3$ | $CH_3$ | H | $CH_2(C_2H_4O)_2C_2H_5$ | 432 |
| 87 | $CH_3$ | $CH_3$ | H | $CH_2(C_2H_4O)_2C_6H_5$ | 432 |
| 88 | $CH_3$ | $CH_3$ | H | $CH_2(C_2H_4O)_2C_4H_9$ | 432 |
| 89 | $CH_3$ | $CH_3$ | H | $CH_2(C_2H_4O)_3C_2H_5$ | 432 |
| 89a | H | $CH_3$ | $CH_3$ | $CH_3$ | 432 |
| 90 | $CH_3$ | $CH_3$ | H | $C_3H_6$-pyrazolyl | 431 |
| 91 | $CH_3$ | $CH_3$ | H | $C_4H_9(n)$ | 431 |
| 92 | H | $CH_3$ | $OCH_3$ | $C_3H_6OCH_2C_6H_5$ | 433 |
| 93 | $CH_3$ | $CH_3$ | H | $CHCH_2OCH_3$ / $CH_3$ | 432 |
| 94 | H | $CH_3$ | $OCH_3$ | $CH_2(C_2H_4O)_2C_2H_5$ | 433 |
| 95 | H | $CH_3$ | $OCH_3$ | $C_3H_6OC_2H_5$ | 433 |
| 96 | H | $CH(CH_3)_2$ | H | $CH_2(C_2H_4O)_2C_6H_5$ | 433 |
| 97 | H | $CH(CH_3)_2$ | H | $C_3H_6OCH_2C_6H_5$ | 433 |

TABLE 2

Structure: $R^1$-CO-phenyl-N=N-pyridone with $R^2$, $R^3$, $R^4$ substituents, OH and =O.

| Ex. No. | $R^1$ | $R^2$ | $R^3$ | $R^4$ | $\lambda_{max}$ [nm] in acetone |
|---|---|---|---|---|---|
| 98 | $CH_3$ | CN | $CH_2(C_2H_4O)_2C_6H_5$ | H | 432 |
| 99 | $CH_3$ | CN | $CH_2(C_2H_4O)_2C_6H_5$ | $CH_3$ | 431 |
| 100 | $CH_3$ | CN | $CH_2(C_2H_4O)_2C_6H_5$ | $C_3H_7(n)$ | 430 |
| 101 | $CH_3$ | CN | $C_3H_6OCH_2C_6H_5$ | H | 432 |
| 102 | $CH_3$ | CN | $C_3H_6OCH_2C_6H_5$ | $CH_3$ | 431 |
| 103 | $CH_3$ | CN | $C_3H_6OCH_2C_6H_5$ | $C_3H_7(n)$ | 430 |
| 104 | $CH_3$ | CN | $C_3H_6O$-cyclohexyl | $CH_3$ | 431 |

TABLE 2-continued

Structure: R¹−C(=O)−[phenyl]−N=N−[pyridinone ring with R², R³, R⁴, HO, =O substituents]

| Ex. No. | R¹ | R² | R³ | R⁴ | $\lambda_{max}$ [nm] in acetone |
|---|---|---|---|---|---|
| 105 | $C_2H_5$ | CN | $CH_2(C_2H_4O)_2C_6H_5$ | $CH_3$ | 432 |
| 106 | $CH_3$ | CN | $CH_2(C_2H_4O)_2CH_3$ | $CH_3$ | 431 |
| 107 | $CH_3$ | CN | $CH_2(C_2H_4O)_2C_2H_5$ | $CH_3$ | 431 |
| 108 | $CH_3OCH_2$ | CN | $CH_2(C_2H_4O)_2C_2H_5$ | $CH_3$ | 431 |
| 109 | $CH_3OCH_2$ | CN | $CH_2(C_2H_4O)_2C_6H_5$ | $CH_3$ | 431 |
| 110 | 2,4-dimethylphenyl | $CONH_2$ | $C_2H_5$ | $CH_3$ | 423* |
| 111 | 2,4-dimethylphenyl | $CONH_2$ | $C_4H_9(n)$ | $CH_3$ | 423* |
| 112 | 2,4-dimethylphenyl | $COCH_3$ | $CH_3$ | $CH_3$ | 424* |
| 113 | 2,4-dimethylphenyl | $COCH_3$ | $C_4H_9(n)$ | $CH_3$ | 424* |

*measured in 9:1 (v/v) N,N-dimethylformamide/glacial acetic acid

TRANSFER OF DYES

To be able to test the transfer characteristics of the dyes in a quantitative and simple manner, the heat transfer process was carried out with large hot plates instead of a thermal printing head, the transfer temperature being varied within the range 70° C. < T < 120° C. and the transfer time being set at 2 minutes.

(A) General recipe for coating the substrates with dye

X g of binder were dissolved in 8 ml (8:2 v/v) of toluene/ethanol at from 40° to 50° C. A solution of 0.25 g of dye in 5 ml of tetrahydrofuran was added by stirring. The print paste thus obtained was applied with an 80 μm knife to a sheet of polyester film (thickness: 6–10 μm) and dried with a hairdryer. (The weight ratio of dye:binder, from which the total amount of binder can be derived, is stated below).

(B) Testing of thermal transferability

The dyes used were tested in the following manner

The polyester sheet donor containing the dye under test on the coated front was placed face down on commercial Hitachi Color Video Print Paper (receiver) and pressed down. Donor/receiver were then wrapped in aluminum foil and heated between two hot plates at different temperatures T (within the temperature range 70° C. < T < 120° C.). The amount of dye diffusing into the bright plastic layer of the receiver is proportional to the optical density (=absorbance A). The latter was determined photometrically. If the logarithm of the absorbance A of the colored receiver papers measured within the temperature range from 80° to 110° C. is plotted against the corresponding reciprocal of the absolute temperature, the result is a straight line whose slope gives the activation energy $\Delta E_T$ for the transfer experiment:

$$\Delta E_T = 2.3 \times R \times \frac{\Delta \log A}{\Delta \left[\frac{1}{T}\right]}$$

To complete the characterization, it is additionally possible to infer from the plots the temperature T*[°C] at which the absorbance A of the colored receiver papers attains the value 2.

The dyes mentioned below in Tables 3, 4 and 5 were processed according to A), and the resulting dyecoated substrates were tested in respect of their transfer characteristics by B). The tables list in each case the heat transfer parameters T* and $\Delta E_T$ and the absorption maxima of the dyes.

In the Examples of Tables 3 and 4, the binder used in each case was a mixture of polyvinylbutyrate/ethylcellulose in a weight ratio of 2:1. The weight ratio of binder:dye was 4:1. The $\lambda_{max}$ values were determined on Hitachi Color Video Print Paper.

In the Examples of Table 5, the binder used was ethylcellulose. The weight ratio of binder:dye was 2:1. The $\lambda_{max}$ values were determined in methylene chloride.

TABLE 3

| Ex. No. | $X^1$ | $X^2$ | $\lambda_{max}$ [nm] | T*[°C.] | $\Delta E_T$ [kcal/mol] |
|---|---|---|---|---|---|
| 114 | OCH$_3$ | C$_3$H$_6$O—⟨C$_6$H$_{10}$⟩—H | 440 | 92 | 13 |
| 115 | OCH$_3$ | C$_4$H$_9$ | 444 | 92 | 13 |
| 116 | OCH$_3$ | C$_3$H$_6$OCH$_3$ | 444 | 85 | 13 |
| 117 | OCH$_3$ | C$_3$H$_6$OC$_2$H$_5$ | 443 | 84 | 15 |
| 118 | OCH$_3$ | CH$_2$(C$_2$H$_4$O)$_2$C$_6$H$_5$ | 440 | 88 | 12 |
| 119 | CH$_3$ | C$_4$H$_9$ | 439 | 78 | 16 |

TABLE 4

| Ex. No: | $X^1$ | $X^2$ | $\lambda_{max}$ [nm] | T*[°C.] | $\Delta E_T$ [kcal/mol] |
|---|---|---|---|---|---|
| 120 | —C$_6$H$_4$—OC$_2$H$_5$ | C$_3$H$_6$O—⟨C$_6$H$_{10}$⟩—H | 440 | 96 | 14 |
| 121 | —C$_6$H$_4$—OCH$_3$ | C$_3$H$_6$O—⟨C$_6$H$_{10}$⟩—H | 440 | 94 | 12 |
| 122 | —C$_6$H$_4$—CH(CH$_3$)$_2$ | C$_3$H$_6$O—⟨C$_6$H$_{10}$⟩—H | 440 | 95 | 17 |
| 123 | CH$_3$ | C$_3$H$_6$OC$_2$H$_4$OC$_6$H$_5$ | 446 | 98 | 10 |
| 124 | CH$_3$ | C$_3$H$_6$OC$_2$C$_6$H$_5$ | 440 | 97 | 12 |
| 125 | CH$_3$ | C$_3$H$_6$OC$_2$H$_4$OC$_2$H$_5$ | 442 | 86 | 15 |
| 126 | CH$_3$ | C$_3$H$_6$OC$_2$H$_4$OCH$_3$ | 438 | 94 | 19 |
| 127 | C$_2$H$_5$ | C$_3$H$_6$OC$_2$H$_4$OC$_6$H$_5$ | 438 | 89 | 13 |
| 128 | —C$_6$H$_4$—OCH$_3$ | C$_3$H$_6$OC$_2$H$_5$ | 446 | 104 | 17 |
| 129 | —C$_6$H$_4$—OCH$_3$ | C$_3$H$_6$OC$_2$H$_4$OC$_2$H$_5$ | 438 | 92 | 19 |
| 130 | —C$_6$H$_4$—OCH$_3$ | C$_3$H$_6$OC$_2$H$_4$OC$_6$H$_5$ | 438 | 102 | 16 |

TABLE 4-continued

Structure:

$X^1-\overset{O}{\underset{\|}{C}}-C_6H_4-N=N-$ [pyridone with CH$_3$, CN, =O, HO, N-X$^2$]

| Ex. No. | X$^1$ | X$^2$ | $\lambda_{max}$ [nm] | T*[°C.] | $\Delta E_T$ [kcal/mol] |
|---|---|---|---|---|---|
| 131 | -C$_6$H$_4$-OC$_2$H$_5$ | C$_3$H$_6$OCH$_3$ | 437 | 89 | 13 |
| 132 | -C$_6$H$_4$-CH(CH$_3$)$_2$ | C$_3$H$_6$OC$_2$H$_4$OCH$_3$ | 439 | 104 | 13 |
| 133 | -C$_6$H$_4$-CH(CH$_3$)$_2$ | CH$_3$OC$_2$H$_4$OC$_2$H$_5$ | 439 | 100 | 11 |
| 134 | -C$_6$H$_4$-CH(CH$_3$)$_2$ | C$_3$H$_6$OC$_2$H$_5$ | 438 | 108 | 13 |

TABLE 5

Structure:

$X^1-\overset{O}{\underset{\|}{C}}-C_6H_4-N=N-$ [pyridone with CH$_3$, X$^2$, =O, HO, N-X$^3$]

| Ex. No. | X$^1$ | X$^2$ | X$^3$ | $\lambda_{max}$ [nm] | T*[°C.] | $\Delta E_T$ [kcal/mol] |
|---|---|---|---|---|---|---|
| 135 | -C$_6$H$_4$-CH(CH$_3$)$_2$ | CN | C$_3$H$_6$OC$_2$H$_5$ | 437 | 81 | 20 |
| 136 | -C$_6$H$_4$-CH(CH$_3$)$_2$ | CN | C$_3$H$_6$OCH$_3$ | 438 | 82 | 21 |
| 137 | C$_4$H$_9$(n) | CN | C$_3$H$_6$OC$_2$H$_4$OC$_6$H$_5$ | 431 | 81 | 27 |
| 138 | -C$_6$H$_4$-CH(CH$_3$)$_2$ | COCH$_3$ | C$_4$H$_6$OC$_2$H$_5$ | 428 | 81 | 20 |
| 139 | -C$_6$H$_3$(CH$_3$)(CH$_3$) | CN | C$_4$H$_9$(n) | 431 | | |

We claim:
1. A phenoneazo dye of the formula I

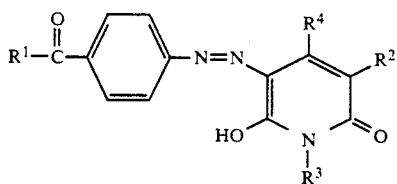

where

R¹ is a radical of the formula

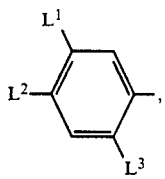

where L¹, L² and L³ are identical or different and each is independently of the others hydrogen, $C_1$-$C_4$-alkyl or $C_1$-$C_4$-alkoxy, R² is cyano, carbamoyl or acetyl, R³ is $C_4$-alkyl or $C_3$-$C_{12}$-alkyl which is interrupted by from 1 to 3 oxygen atoms and may be substituted by $C_1$-$C_4$-alkanoyloxy, cyclohexyloxy, phenoxy which may be $C_1$-$C_4$-alkoxy-substituted or phenyl, and R⁴ is hydrogen or $C_1$-$C_4$-alkyl, with the proviso that (a) L¹, L², and L³ are not all hydrogen at one end and the same time, and (b) when two members of the set L¹, L², and L³ are hydrogen, the third member is $C_1$-$C_4$-alkoxy.

2. A phenoneazo dye as claimed in claim 1, wherein R¹ is a radical of the formula

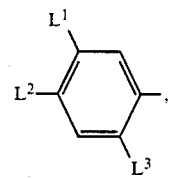

in which two members of the set L¹, L² and L³ are each hydrogen and the third member is $C_1$-$C_2$-alkoxy or two members of the set L¹, L² and L³ are each methyl and the third is hydrogen, R² is cyano, R⁴ is hydrogen or $C_1$-$C_2$-alkyl and R³ is as defined in claim 1.

3. A phenoneazo dye of the formula

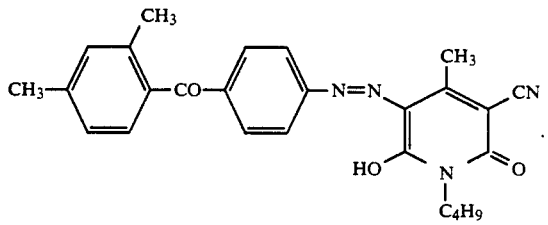

4. A phenoneazo dye of the formula

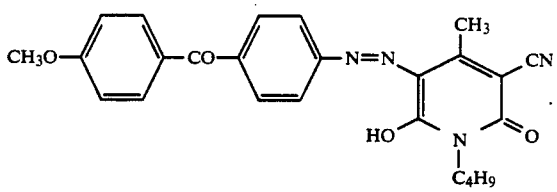

* * * * *